(12) United States Patent
Katta et al.

(10) Patent No.: US 7,218,678 B2
(45) Date of Patent: May 15, 2007

(54) DIGITAL DATA TRANSMITTER

(75) Inventors: Noboru Katta, Itami (JP); Yuji Mizuguchi, Hirakata (JP); Takahisa Sakai, Amagasaki (JP); Hirotsugu Kawada, Sakai (JP); Toshihiko Kurosaki, Kobe (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 912 days.

(21) Appl. No.: 10/398,450

(22) PCT Filed: Oct. 5, 2001

(86) PCT No.: PCT/JP01/08788

§ 371 (c)(1),
(2), (4) Date: Apr. 4, 2003

(87) PCT Pub. No.: WO02/30076

PCT Pub. Date: Apr. 11, 2002

(65) Prior Publication Data

US 2004/0028145 A1    Feb. 12, 2004

(30) Foreign Application Priority Data

Oct. 5, 2000   (JP)   ............................. 2000-305821
Mar. 6, 2001   (JP)   ............................. 2001-061322

(51) Int. Cl.
*H04L 27/00*   (2006.01)
(52) U.S. Cl. ....................... 375/259; 375/295; 375/316
(58) Field of Classification Search ................ 375/259, 375/261, 295, 296, 316, 231, 358, 371
See application file for complete search history.

(56) References Cited

U.S. PATENT DOCUMENTS 4,028,667 A   6/1977   Breslau et al.
(Continued)

FOREIGN PATENT DOCUMENTS

EP   0 450 879   10/1991
(Continued)

OTHER PUBLICATIONS

Clayton: "Introduction to Electromagnetic Compatibility" 1992, chapters 8 and 13, John Wiley & Sons, New York, US, XP002279634.
(Continued)

*Primary Examiner*—Emmanuel Bayard
(74) *Attorney, Agent, or Firm*—Wenderoth, Lind & Ponack, L.L.P.

(57) ABSTRACT

A digital data transmission apparatus includes a transmitting end (100) that includes: a binary/quadrary conversion unit (110) for converting a data stream; a coding unit (120) for mapping converted data to be coded; a digital filter (130); a D/A conversion unit (140); a low-pass filter (150) for attenuating noises which are caused by folding distortion; a differential driver (160); low-pass filters (170a) and (170b) for eliminating noises from differentially outputted signals; and a common mode choke coil (180) for eliminating common mode noises and outputting a resultant signal to a twisted pair cable (300), and a receiving end (200) that includes: a low-pass filter (210) for eliminating noises from the twisted pair cable; a receiver (220); an A/D conversion unit (230); a digital filter (240); an evaluation unit (250) for evaluating a signal level of a received signal; a decoding unit (260) for decoding the signal level into received data; and a synchronization unit (270) for generating a clock.

44 Claims, 7 Drawing Sheets

U.S. PATENT DOCUMENTS

| | | | |
|---|---|---|---|
| 4,083,005 A | | 4/1978 | Looschen |
| 4,547,879 A | | 10/1985 | Hamelin et al. |
| 4,769,839 A | | 9/1988 | Preineder et al. |
| 4,924,492 A | * | 5/1990 | Gitlin et al. ............. 379/93.08 |
| 4,982,185 A | | 1/1991 | Holmberg et al. |
| 5,052,021 A | | 9/1991 | Goto et al. |
| 5,297,163 A | * | 3/1994 | Pfeiffer ...................... 375/222 |
| 5,303,265 A | | 4/1994 | McLean |
| 5,812,594 A | * | 9/1998 | Rakib ......................... 375/219 |
| 5,850,441 A | | 12/1998 | Townsend et al. |
| 6,157,680 A | * | 12/2000 | Betts et al. ................. 375/285 |
| 6,421,323 B1 | | 7/2002 | Nelson et al. |
| 6,545,532 B1 | | 4/2003 | Maalej et al. |
| 7,003,023 B2 | * | 2/2006 | Krone et al. ................ 375/219 |
| 7,023,868 B2 | * | 4/2006 | Rabenko et al. ............ 370/419 |
| 2002/0106037 A1 | | 8/2002 | Gara |
| 2004/0028145 A1 | | 2/2004 | Katta et al. |

FOREIGN PATENT DOCUMENTS

| | | |
|---|---|---|
| EP | 0 490 504 | 6/1992 |
| EP | 0 511 786 | 11/1992 |
| JP | 55-38633 | 3/1980 |
| JP | 63-110840 | 5/1988 |
| JP | 02-186710 | 7/1990 |
| JP | 3-195144 | 8/1991 |
| JP | 5-14419 | 1/1993 |
| JP | 6-29987 | 2/1994 |
| JP | 7-50683 | 2/1995 |
| JP | 2000-49764 | 2/2000 |
| JP | 2000-134269 | 5/2000 |

OTHER PUBLICATIONS

Oscar Agazzi and Alberto A. Adan, "An Analog Front End for Full-Duplex Digital Transceivers Working on Twisted Pairs", IEEE Journal of Solid-State Circuits, vol. 24, No. 2, Apr. 1989, pp. 229-240.

* cited by examiner

| set value \ previous value | 0 | 1 | 2 | 3 | 4 |
|---|---|---|---|---|---|
| 0 |  | 01 | 01 | 01 | 01 |
| 1 | 01 |  | 11 | 11 | 11 |
| 2 | 11 | 11 |  | 00 | 00 |
| 3 | 00 | 00 | 00 |  | 10 |
| 4 | 10 | 10 | 10 | 10 |  |

| set value \ previous value | 0 | 1 | 2 | 3 | 4 |
|---|---|---|---|---|---|
| 0 |  | 01 | 01 | 01 | 01 |
| 1 | 01 |  | 11 | 11 | 11 |
| 2 | 11 | 11 |  | 00 | 00 |
| 3 | 00 | 00 | 00 |  | 10 |
| 4 | 10 | 10 | 10 | 10 |  |

| set value \ previous value | 0 | 1 | 2 | 3 | 4 |
|---|---|---|---|---|---|
| 0 |  | (01) | 01 | 01 | 01 |
| 1 | (01) |  | 11 | [11] | [11] |
| 2 | 11 | 11 |  | 00 | 00 |
| 3 | [00] | [00] | 00 |  | (10) |
| 4 | 10 | 10 | 10 | (10) |  |

| set value \ previous value | 0 | 1 | 2 | 3 | 4 |
|---|---|---|---|---|---|
| 0 |  | 10 | 00 | 11 | 01 |
| 1 | 01 |  | 10 | 00 | 11 |
| 2 | 11 | 01 |  | 10 | 00 |
| 3 | 00 | 11 | 01 |  | 10 |
| 4 | 10 | 00 | 11 | 01 |  |

Fig.13

|  | preceding symbol:0 | preceding symbol:1 |
|---|---|---|
| data : 0 | 10 | 01 |
| data : 1 | 11 | 00 |

DIGITAL DATA TRANSMITTER

TECHNICAL FIELD

The present invention relates to a digital data transmission apparatus and, more particularly, to a digital data transmission apparatus that reduces emission of noises by a digital filter.

BACKGROUND ART

Some conventional data transmission apparatuses convert digital data into signal levels of electric signals or optical signals to be transmitted. The transmission rates have been increased through the years and, recently, some apparatuses transmit large amounts of data, such as video signals, at transmission rates of several tens of megabits/sec. The frequencies of these signals are so high that emitted noises cause large problems when these signals are transmitted through copper wires or the like.

For example, when such apparatus is mounted on a motor vehicle or the like, emitted noises may cause malfunctions of other electronic equipment that is mounted on the motor vehicle. Accordingly, there is a need to make the apparatus hardly emit noises when mounted on the vehicles. It is also required that the apparatus can transmit data correctly without being affected by noises emitted from other equipment. Similarly, factory automation machinery or precision machines such as medical devices also require reduction in noise emission and resistance to noise.

The conventional data transmission apparatuses utilize a method in which optical fiber cables are employed in place of the copper wires so as to emit no electromagnetic waves. When the copper wires are employed, the voltage of a transmission signal is suppressed at a lower level to reduce emission of noises. There is also employed a method in which a transmission cable for transmitting signals is covered with another shielded wire to prevent the emitted noises from leaking outside. In the case of low-speed signal transmission, a transmission cable such as a twisted pair cable that is obtained by twisting two transmission wires is employed, and signals having opposite polarities are passed through the respective wires, so that the signals cancel each other out, whereby noises are hardly emitted outside. The twisted pair cable has the advantage in having a simple structure and it can be manufactured without great difficulty and accordingly at a reduced cost, while noise emission cannot be reduced satisfactorily at high-speed transmission.

In addition, the digital transmission requires communications with higher reliability. One of factors that reduce the reliability in the digital transmission is that when the transmission signal constantly takes the same signal level, synchronization of symbol timing cannot be obtained at the receiving end.

Conventionally, in order to improve the reliability of receipt, the transmission signal has been processed so that it does not keep on taking the same level. One of the methods for processing the transmission signal is scrambling. The scrambling is a method by which random numbers are added to digital data to be transmitted, thereby to prevent the transmission signal from successively taking the same signal level even when digital data to be transmitted successively take the same value. In the case of binary transmission in which data are transmitted by two values, the data are coded according to the bi-phase mark method, thereby to prevent the same signal level from successively appearing.

The bi-phase mark coding method is employed as a standard transmission method when digital data of audio data are transmitted. FIG. 13 is a diagram for explaining the bi-phase mark coding method. According to the bi-phase mark coding method, depending on whether the immediately preceding symbol is 1 or 0, the next data to be transmitted is coded differently, thereby converting 1-bit data to be transmitted into a 2-bit symbol. Accordingly, a signal sequence that is coded as shown in FIG. 13 is assured that it never takes the same signal level successively three or more times. Thus, the symbol timing of the transmitted data can be detected on the receiving end, whereby the data can be reproduced correctly.

The data transmission apparatus employing optical fibers emits no noise, while it requires expensive elements such as light-to-electricity converters or fiber couplers with less optical loss. In addition, the optical fiber has a problem in its strength, such as limitation in the bend angle of the cable, so that the application range thereof is limited.

Further, according to the method in which the copper signal cable is covered with a shielded wire, some noises are eliminated by the shielding effect, while the shielded wire between the transmitting and receiving ends must be grounded sufficiently to provide effective shielding, and the prices of connectors, cables, or the like for that purpose get higher.

Furthermore, according to the method in which signals having opposite polarities are passed through a twisted pair cable, when the signals to be transmitted include higher frequency components, the signals which flow through two transmission wires of the cable do not always cancel each other out due to slight asymmetry between the two transmission wires, whereby noises occur unfavorably, so that a sufficient reduction in noises cannot be obtained in the case of high-speed data transmission.

Thus, the digital signal to be transmitted is conventionally converted into a rectangular-wave signal having the corresponding signal level, and then higher frequency components are eliminated by means of a low-pass filter utilizing a resistor, a coil, a capacitor, or the like, thereby to reduce noises. However, it is difficult to give steep high-band cut-off characteristics to a filter composed of analog elements, without loosing digital information included in signals being transmitted, and accordingly the noises cannot be eliminated satisfactorily unless the symbol rate of the signal itself is sufficiently low.

In utilizing the scrambling in the data transmission apparatus, when a data pattern to be transmitted matches with a random number sequence employed at the scrambling, the same signal level would successively appear, resulting in that discontinuity of the same signal level cannot always be assured. While the bi-phase mark method assures the discontinuity of the same signal level at the binary transmission, when multi-valued transmission is performed in cases where several bits of data are transmitted at one time, the discontinuity of the same signal level cannot be obtained. In recent years, demands for multi-valued transmission have grown to implement higher-speed digital transmission or more efficient data transmission in a limited band, and the need for a method for more accurate data transmission at the multi-valued transmission has arisen. Further, in order to introduce a new transmission apparatus, replacement of the conventional transmission method or the like should be taken into consideration. More specifically, the new apparatus needs to be able to transmit data of the conventional transmission format without problems and, in the case of audio data for example, it is preferable that it can also transmit bi-phase mark data accurately.

Further, like in a case where the data transmission apparatus is mounted on a motor vehicle or the like, when the apparatus is in such environments that the ground levels of connected devices greatly differ from each other or the fluctuations of the voltage are considerable, it is difficult to correctly transmit the voltage level at the transmitting end to the receiving end. Accordingly, phase modulation or the like is conventionally employed to enable data reproduction even when the absolute voltage cannot be detected accurately between the transmission end and the receiving end. However, a modulation method utilizing a specific carrier frequency unfavorably requires a frequency band that is twice as large as the frequency band of the baseband method that does not utilize the modulation.

Besides, in the data communication on motor vehicles, the amount of electromagnetic waves emitted from the transmission signal is limited so that the electromagnetic waves do not cause malfunctions of other equipment. One of International Standards concerning electromagnetic wave noises emitted from the equipment or communication wires on the motor vehicle is CISPR25. CISPR25 defines a limitation value of emitted noises for each frequency and, particularly, there are strict limitations on signals having frequencies of 30 MHz or higher. Therefore, it is desirable that data should be transmitted in a frequency band of 30 MHz or lower, in which countermeasures against the electromagnetic waves, such as shielding the signal lines to reduce noises, can be taken without great difficulty. In order to transmit data efficiently in this frequency band, a data transmission method that is resistant to voltage fluctuations is needed also when the multi-valued transmission is performed without using modulation.

The present invention is made to solve the above-mentioned problems, and has for its object to provide a digital data transmission apparatus that emits few noises and has a higher resistance to noises, using inexpensive cables such as twisted pair cable, in data transmission at high speeds such as above 20 Mbps, and a transmission line coding method and decoding method in which the same signal level will not successively appear also at the multi-valued transmission.

DISCLOSURE OF THE INVENTION

To solve the above-mentioned problems, according to one embodiment of the present invention, there is provided a digital data transmission apparatus comprising: a data coding means for converting digital data into a signal level corresponding to a symbol that is assigned to the digital data in each symbol cycle as a prescribed unit cycle; a first digital filter that has a first sampling cycle that is shorter than a unit cycle of a signal level string which has been obtained by the data coding means, and allows only predetermined frequencies to pass; a D/A conversion means for converting the digital data stream that has passed through the digital filter, into an analog signal; a first low-pass filter for eliminating folding distortion of the first digital filter from the analog signal obtained by the D/A conversion means, which distortion is decided in the first sampling cycle; a differential driver for converting an output of the first low-pass filter, into two signals having opposite polarities relative to a predetermined reference potential, and differentially outputting the obtained signals; a second low-pass filter for eliminating a predetermined frequency band from each of the signals which are outputted from the differential driver, and outputting obtained signals to a twisted pair cable; a differential receiver for receiving transmission signals transmitted through the twisted pair cable, and converting a difference in potential between two wires of the cable into a signal; an A/D conversion means for converting the signal outputted from the differential receiver into a digital signal value in each second sampling cycle; a second digital filter that allows only a predetermined frequency band of a digital data stream that has been obtained by sampling of by the A/D conversion means, to pass; and a level evaluation means for evaluating a symbol value from a level of a signal in symbol timing, including a symbol in the signal, on the basis of an output from the second digital filter, and converting the symbol value into corresponding digital data, and the first and second digital filters both have low-pass characteristics, and the first digital filter has frequency characteristics of cutting off at least frequency data which are higher than a frequency band in which electromagnetic waves emitted from the respective signals that pass through the twisted pair cable cancel each other out, thereby to eliminate emission of electromagnetic waves to outside the twisted pair cable, and further combination of the first low-pass filter and the second low-pass filter has low band cut-off characteristics of eliminating folding distortion of the first digital filter, which is decided in the first sampling cycle.

According to another embodiment of the present invention, the digital data transmission apparatus discussed above further includes: a common mode choke coil for eliminating common mode noises from the signals, from which the predetermined frequency band has been eliminated by the second low-pass filter, and outputting obtained signals to the twisted pair cable.

According to another embodiment of the present invention, in a digital data transmission apparatus, discussed above transmission characteristics of signals which have been passed through the first and second digital filters comprises roll-off characteristics.

According to another embodiment of the present invention, in a digital data transmission apparatus, discussed above the data coding means converts data comprising two or more bits per symbol cycle, into a symbol to be transmitted.

According to another embodiment of the present invention, in a digital data transmission apparatus, discussed above the data coding means includes signal levels which are more than the number of kinds of symbols to be transmitted per symbol cycle, and assigns a symbol in a symbol transmission timing to one of the signal levels.

According, another embodiment of the present invention, in a digital data transmission apparatus, discussed above the data coding means includes five signal levels, and assigns a symbol in a symbol transmission timing to a signal level other than a previous signal level corresponding to a signal which was transmitted in immediately preceding symbol transmission timing, in the order of 01, 11, 00, 10, starting from a lowest signal level.

According to another embodiment of the present invention, in a digital data transmission apparatus, discussed above digital data to be transmitted have been coded by a bi-phase mark method, and the data coding means assigns a symbol in a symbol transmission timing to a signal level other than a previous signal level corresponding to a signal which was transmitted in immediately preceding symbol transmission timing, in the order of 01, 11, 00, 10, starting from a lowest signal level, thereby to decide a signal level to be transmitted.

According another embodiment of the present invention, in a digital data transmission apparatus, discussed above the data coding means includes: a previous signal level storage means for storing a previous signal level corresponding to the signal which was transmitted in the immediately preceding symbol transmission timing; and a coding means for deciding a signal level corresponding to the symbol to be transmitted, on the basis of the previous signal level and the transmission symbol.

According to another embodiment of the present invention, in a digital data transmission apparatus, discussed above the coding means assigns a symbol in a symbol transmission timing to a signal level having a predetermined difference from the previous signal level that is stored in the previous signal level storage means.

According to another embodiment of the present invention, in a digital data transmission apparatus of, discussed above the data coding means is supplied with a transmission method instruction signal indicating whether or not the transmission signal has been coded by the bi-phase mark method.

According to another embodiment of the present invention, in a digital data transmission apparatus, discussed above the level evaluation means includes: a signal level detection means for detecting a signal level in each symbol cycle; and a previous signal level storage means for storing the previous signal level which was received in immediately preceding receipt timing, and the level evaluation means decodes the signal level detected by the signal level detection means, into a corresponding symbol, on the basis of the previous signal level that is stored in the previous signal level storage means.

According to another embodiment of the present invention, in a digital data transmission apparatus, discussed above the level evaluation means includes: a threshold control means for correcting an evaluation threshold level on the basis of variation values in respective signal levels which were received during a predetermined period; a previous signal level storage means for storing a previous signal level corresponding to a signal which was received in immediately preceding symbol receipt timing; and a threshold evaluation means for holding a threshold, and performing threshold evaluation for a difference in signal level between a signal level detected in a symbol receipt timing and the previous signal level, thereby to decode a symbol value.

According to another embodiment of the present invention, in a digital data transmission apparatus, discussed above the level evaluation means includes a synchronization means for establishing synchronization with a symbol cycle of a received signal, and the synchronization means extracts frequency components having a half cycle as long as the symbol cycle from the received signal, and controls a symbol timing at which a symbol is detected, on the basis of a phase of an extracted signal.

According to another embodiment of the present invention, in a digital data transmission apparatus of any, discussed above the level evaluation means is supplied with a transmission method instruction signal indicating whether the received signal has been coded by the bi-phase mark method.

According to another embodiment of the present invention, there is provided a data transmission apparatus including: a data coding means for converting digital data into a signal level corresponding to a symbol that is assigned to the digital data in each symbol cycle as a prescribed unit cycle; a first digital filter that has a first sampling cycle that is shorter than a unit cycle of a signal level string which has been coded by the data coding means, and allows only predetermined frequencies to pass; a D/A conversion means for converting the digital data stream that has passed through the digital filter, into an analog signal; a first low-pass filter for eliminating folding distortion of the first digital filter from the analog signal obtained by the D/A conversion means, which distortion is decided in the first sampling cycle; a differential driver for converting an output of the low-pass filter, into two signals having opposite polarities relative to a predetermined reference potential, and differentially outputting the two signals; a second low-pass filter for eliminating a predetermined frequency band from each of the signals which are outputted from the differential driver; and a common mode choke coil for eliminating common mode noises and outputting obtained signals to a twisted pair cable, and the first digital filter has frequency characteristics of cutting off at least frequency data which are higher than a frequency band in which electromagnetic waves emitted from the respective signals that pass through the twisted pair cable cancel each other out, thereby to eliminate emission of the electromagnetic waves to outside the twisted pair cable, and further combination of the first low-pass filter and the second low-pass filter has low band cut-off characteristics of eliminating folding distortion of the first digital filter, which is decided in the first sampling cycle.

Thus, according to another embodiment of the present invention, wherein there is provided a digital data transmission apparatus comprising: a data coding means for converting digital data into a signal level corresponding to a symbol that is assigned to the digital data in each symbol cycle as a prescribed unit cycle; a first digital filter that has a first sampling cycle that is shorter than a unit cycle of a signal level string which has been obtained by the data coding means, and allows only predetermined frequencies to pass; a D/A conversion means for converting the digital data stream that has passed through the digital filter, into an analog signal; a first low-pass filter for eliminating folding distortion of the first digital filter from the analog signal obtained by the D/A conversion means, which distortion is decided in the first sampling cycle; a differential driver for converting an output of the first low-pass filter, into two signals having opposite polarities relative to a predetermined reference potential, and differentially outputting the obtained signals; a second low-pass filter for eliminating a predetermined frequency band from each of the signals which are outputted from the differential driver, and outputting obtained signals to a twisted pair cable; a differential receiver for receiving transmission signals transmitted through the twisted pair cable, and converting a difference in potential between two wires of the cable into a signal; an A/D conversion means for converting the signal outputted from the differential receiver into a digital signal value in each second sampling cycle; a second digital filter that allows only a predetermined frequency band of a digital data stream that has been obtained by sampling of by the A/D conversion means, to pass; and a level evaluation means for evaluating a symbol value from a level of a signal in symbol timing, including a symbol in the signal, on the basis of an output from the second digital filter, and converting the symbol value into corresponding digital data, and the first and second digital filters both have low-pass characteristics, and the first digital filter has frequency characteristics of cutting off at least frequency data which are higher than a frequency band in which electromagnetic waves emitted from the respective signals that pass through the twisted pair cable cancel each other out, thereby to eliminate emission of electromagnetic waves to outside the twisted pair cable, and further combination of the first low-pass filter and the second low-pass filter has low band cut-off characteristics of eliminating folding distortion of the first digital filter, which is decided in the first sampling cycle, therefore a higher transmission rate can be realized. In addition, a frequency band of the transmission signal can be limited to a frequency band having a noise elimination effect that is achieved when the signals having opposite polarities are passed through the twisted pair cable, thereby removing almost all electromagnetic noises also at high-speed data transmission. Further, noise elimination characteristics required for a low-pass filter can be dividedly given to two low-pass filters, i.e., the first low-pass filter and the second low-pass filter, so that there is no need to give steep attenuation characteristics to the respective low-pass filters, resulting in uncomplicated constructions and reduced product costs of the filters. Furthermore, noises which are caused by the distortion of the differential driver can be eliminated by the second low-pass filter.

According to another embodiment of the present invention, wherein a digital data transmission apparatus discussed above further includes: a common mode choke coil for eliminating common mode noises from the signals, from which the predetermined frequency band has been eliminated by the second low-pass filter, and outputting obtained signals to the twisted pair cable, common mode noises which occur in both wires of the twisted pair cable can be eliminated.

According to another embodiment of the present invention, wherein in a digital data transmission apparatus, discussed above transmission characteristics of signals which have been passed through the first and second digital filters comprises roll-off characteristics, the signal which has passed through the first digital filter and the second digital filter can be converted into a signal within a band that is slightly larger than half of the symbol rate. In addition, the signal is converted into a signal having no interference between adjacent codes in symbol timing, whereby a symbol included in the signal can be read in symbol timing.

According to another embodiment of the present invention, wherein in a digital data transmission apparatus, discussed above the data coding means converts data comprising two or more bits per symbol cycle, into a symbol to be transmitted, the symbol rate can be lowered, thereby realizing a high transmission rate. Further, each time one symbol is coded, a signal level that represents the symbol can be transmitted, thereby realizing data transmission with little delay.

According to of the present invention, wherein in a digital data transmission apparatus, discussed above the data coding means includes signal levels which are more than the number of kinds of symbols to be transmitted per symbol cycle, and assigns a symbol in a symbol transmission timing to one of the signal levels, the symbol can be assigned to a predetermined signal level to be coded. Further, the symbol can be converted into a signal level that is different from the previous signal level, whereby the signals outputted from the transmitting end constantly vary with symbol timing, and synchronization can be readily obtained on the receiving end.

According to another embodiment of the present invention, wherein in a digital data transmission apparatus, discussed above the data coding means includes five signal levels, and assigns a symbol in a symbol transmission timing to a signal level other than a previous signal level corresponding to a signal which was transmitted in immediately preceding symbol transmission timing, in the order of 01, 11, 00, 10, starting from a lowest signal level, the symbol can be assigned to a predetermined signal level to be coded.

According to another embodiment of the present invention, wherein in a digital data transmission apparatus, discussed above digital data to be transmitted have been coded by a bi-phase mark method, and the data coding means assigns a symbol in a symbol transmission timing to a signal level other than a previous signal level corresponding to a signal which was transmitted in immediately preceding symbol transmission timing, in the order of 01, 11, 00, 10, starting from a lowest signal level, thereby to decide a signal level to be transmitted, the data coded by the bi-phase mark method can be decoded to obtain a symbol by evaluating a signal only by an evaluation as to whether the data is higher or lower than one threshold, like in the binary transmission, whereby signal detection having a reliability that is quite close to the binary evaluation is performed. Further, possible values taken in the respective symbol timing are binary, and the distance between symbols is 2 or more symbols across the signal level 2, so that the possibility of error evaluation caused by noises can be reduced to a level as low as the binary transmission.

According to another embodiment of the present invention, wherein in a digital data transmission apparatus of, discussed above the data coding means includes: a previous signal level storage means for storing a previous signal level corresponding to the signal which was transmitted in the immediately preceding symbol transmission timing; and a coding means for deciding a signal level corresponding to the symbol to be transmitted, on the basis of the previous signal level and the transmission symbol, a symbol can be assigned to a predetermined signal level to be coded. In addition, the symbol can be converted into a signal level that is different from the previous signal level.

According to another embodiment of the present invention, wherein in a digital data transmission apparatus, discussed above the coding means assigns a symbol in a symbol transmission timing to a signal level having a predetermined difference from the previous signal level that is stored in the previous signal level storage means, the receiving end can evaluate a symbol of a received signal only on the basis of a difference in signal level from the previous signal level. Further, data transmission can be performed correctly also in cases where the transmitting end and the receiving end have different voltage levels at multi-valued transmission of the baseband, or in environments where fluctuations in the voltage are large.

According to another embodiment of the present invention, wherein in a digital data transmission apparatus of, discussed above the data coding means is supplied with a transmission method instruction signal indicating whether or not the transmission signal has been coded by the bi-phase mark method, the transmission signal can be coded in accordance with the transmission method, whereby data based on the bi-phase mark method as a conventional transmission method can be transmitted.

According to another embodiment of the present invention, wherein in a digital data transmission apparatus, discussed above the level evaluation means includes: a signal level detection means for detecting a signal level in each symbol cycle; and a previous signal level storage means for storing the previous signal level which was received in immediately preceding receipt timing, and the level evaluation means decodes the signal level detected by the signal level detection means, into a corresponding symbol, on the basis of the previous signal level that is stored in the previous signal level storage means, the symbol of the received signal can be evaluated on the basis of the previous signal level and the signal level of the received signal. Further, each time one signal level is received, a symbol represented by the signal level can be obtained, thereby realizing data receipt with little delay.

According to another embodiment of the present invention, wherein in a digital data transmission apparatus, discussed above the level evaluation means includes: a threshold control means for correcting an evaluation threshold level on the basis of variation values in respective signal levels which were received during a predetermined period; a previous signal level storage means for storing a previous signal level corresponding to a signal which was received in immediately preceding symbol receipt timing; and a threshold evaluation means for holding a threshold, and performing threshold evaluation for a difference in signal level between a signal level detected in a symbol receipt timing and the previous signal level, thereby to decode a symbol value, a symbol of a received signal can be evaluated only on the basis of the difference in signal level from the previous signal level. Thus, for example when the transmitting end and the receiving end have different potentials or when the potentials vary, the data can be correctly decoded even when the absolute voltage level on the transmitting end cannot be detected. Further, the threshold is modified on the basis of the evaluation results on signals which have been received for a predetermined time period, so that correct data can be obtained by modifying the threshold in cases where transmitted voltages vary according to fluctuations in the supply voltage, or the like.

According to another embodiment of the present invention, wherein in a digital data transmission apparatus, discussed above the level evaluation means includes a synchronization means for establishing synchronization with a symbol cycle of a received signal, and the synchronization means extracts frequency components having a half cycle as long as the symbol cycle from the received signal, and controls a symbol timing at which a symbol is detected, on the basis of a phase of an extracted signal, a more reliable synchronization can be obtained utilizing changes in the signal level of the received signal.

According to another embodiment of the present invention, wherein in a the digital data transmission apparatus of, discussed above the level evaluation means is supplied with a transmission method instruction signal indicating whether or not the received signal has been coded by the bi-phase method, the transmitted data can be decoded in accordance with the transmission method, whereby data based on the bi-phase mark method as a conventional transmission method can be received.

According to another embodiment of the present invention, wherein there is provided a data transmission apparatus including: a data coding means for converting digital data into a signal level corresponding to a symbol that is assigned to the digital data in each symbol cycle as a prescribed unit cycle; a first digital filter that has a first sampling cycle that is shorter than a unit cycle of a signal level string which has been coded by the data coding means, and allows only predetermined frequencies to pass; a D/A conversion means for converting the digital data stream that has passed through the digital filter, into an analog signal; a first low-pass filter for eliminating folding distortion of the first digital filter from the analog signal obtained by the D/A conversion means, which distortion is decided in the first sampling cycle; a differential driver for converting an output of the low-pass filter, into two signals having opposite polarities relative to a predetermined reference potential, and differentially outputting the two signals; a second low-pass filter for eliminating a predetermined frequency band from each of the signals which are outputted from the differential driver; and a common mode choke coil for eliminating common mode noises and outputting obtained signals to a twisted pair cable, and the first digital filter has frequency characteristics of cutting off at least frequency data which are higher than a frequency band in which electromagnetic waves emitted from the respective signals that pass through the twisted pair cable cancel each other out, thereby to eliminate emission of the electromagnetic waves to outside the twisted pair cable, and further combination of the first low-pass filter and the second low-pass filter has low band cut-off characteristics of eliminating folding distortion of the first digital filter, which is decided in the first sampling cycle, a high transmission rate can be obtained. In addition, the frequency band of the transmission signal can be limited to a frequency band having a noise elimination effect that is achieved when the signals having opposite polarities are passed through a twisted pair cable, thereby removing almost all electromagnetic noises also at the high-speed transmission. Further, there is no need to give steep attenuation characteristics to the first low-pass filter and the second low-pass filter, resulting in uncomplicated constructions and reduced product costs of the filters. Further, noises caused by the distortion of the differential driver can be eliminated.

BRIEF DESCRIPTION OF THE DRAWINGS

FIG. 13 is a diagram for explaining a coding method according to a bi-phase mark method as a conventional transmission method.

BEST MODE FOR CARRYING OUT THE INVENTION

Hereinafter, an embodiment of the present invention will be described with reference to the drawings. The embodiment shown here is only exemplary, and the invention is not limited to this embodiment.

[Embodiment 1]

Initially, a digital data transmission apparatus and a data transmission apparatus will be described as a first embodiment, with reference to the drawings.

Figure 1:
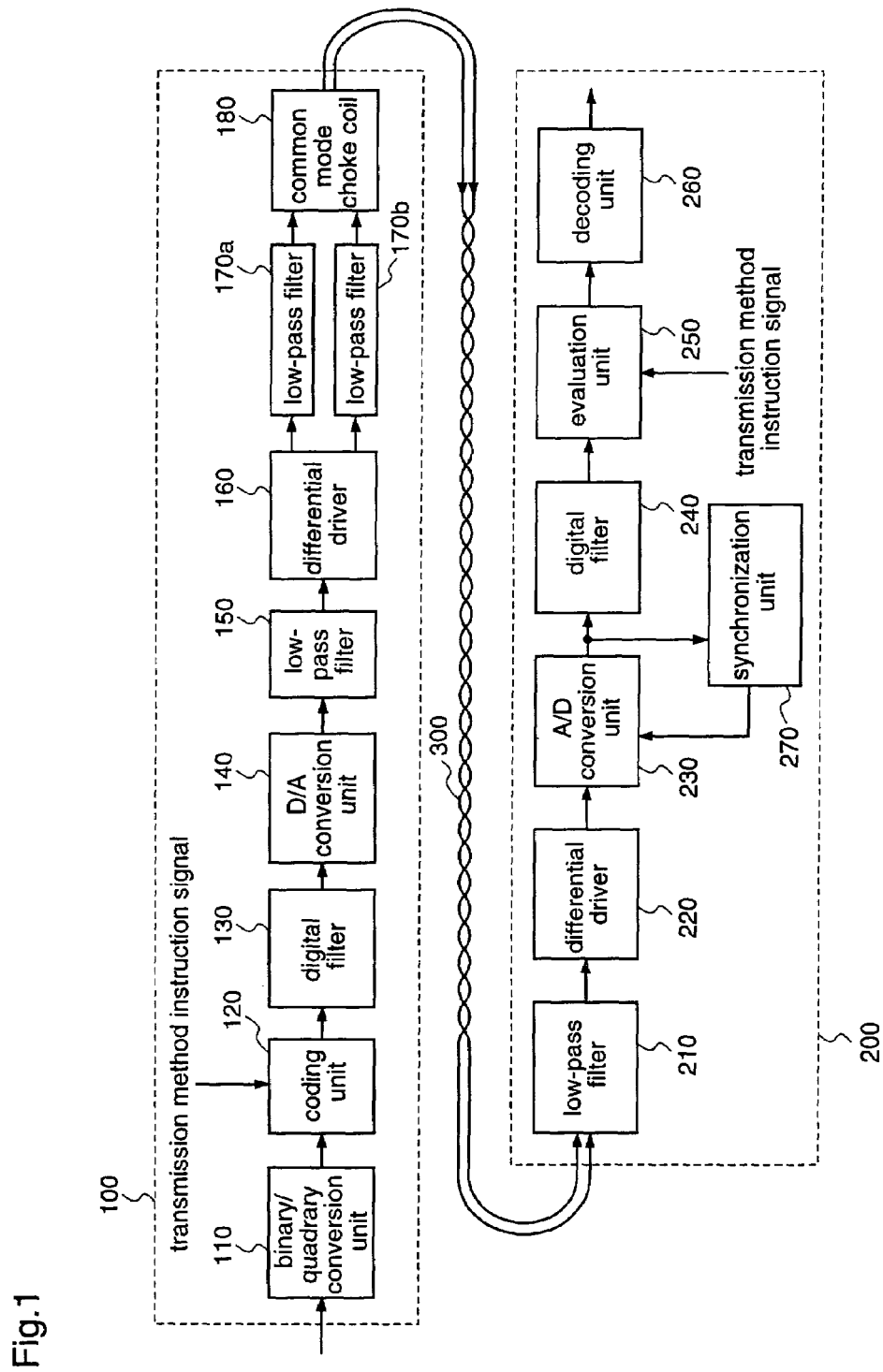
FIG. 1 is a block diagram illustrating a structure of a digital data transmission apparatus according to a first embodiment of the present invention.

FIG. 1 is a block diagram illustrating a structure of a digital data transmission apparatus according to the first embodiment.

As shown in FIG. 1, the digital data transmission apparatus according to the first embodiment includes a transmitting end 100 for transmitting data, and a receiving end 200 for receiving the data transmitted from the transmitting end 100, which are connected with each other through a twisted pair cable 300.

The transmitting end 100 includes a binary-to-quadrary conversion unit 110 for converting a 1-bit data stream into a 2-bit (four-valued) data stream; a coding unit 120 for mapping 2-bit data that is obtained by the binary/quadrary conversion unit to a predetermined signal level to be coded; a digital filter 130 that allows a band of frequency components corresponding to half of a symbol rate to pass; a D/A conversion unit 140 for converting the 2-bit data that has passed through the digital filter 130 into an analog signal; a low-pass filter 150 for attenuating noises due to folding distortion of the digital filter; a differential driver 160 for converting the analog signal that has passed through the low-pass filter 150 into two signals having opposite polarities relative to a reference potential, and differentially outputting the two signals toward the twisted pair cable 300; low-pass filters 170a and 170b that eliminate noises from the respective signals which are outputted from the differential driver 160; and a common mode choke coil 180 that eliminates common mode noises that occur in the respective signal lines.

The receiving end 200 includes a low-pass filter 210 that eliminates noises outside the signal band of a transmission signal for both wires of the twisted pair cable 300; a differential receiver 220 for receiving a signal that has passed through the low-pass filter 210; an A/D conversion unit 230 for converting the received signal into a digital signal; a digital filter 240 that allows only a predetermined frequency band to pass; an evaluation unit 250 for evaluating the level of the received signal; a decoding unit 260 for decoding the signal level evaluated by the evaluation unit 250 into 2-bit receipt data; and a synchronization unit 270 for generating a clock that is employed at the A/D conversion.

The operation of the digital data transmission apparatus that is constructed as described above will be described.

A digital signal that is transmitted through the transmitting end 100 is initially inputted to the binary/quadrary conversion unit 110. The binary/quadrary conversion unit 110 converts a 1-bit data stream into a 2-bit (four-valued) data stream, i.e., "01", "11", "00", or "10", and transmits the 2-bit data stream to the coding unit 120.

Figures 2, 3:
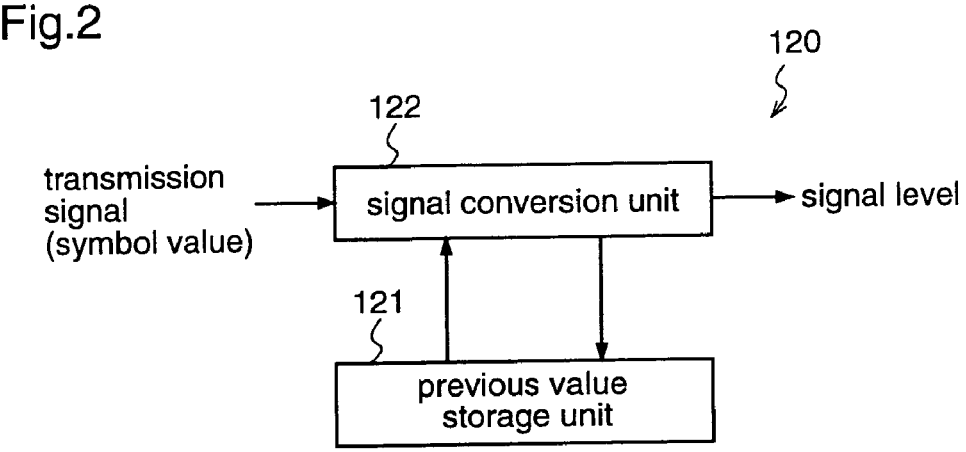
FIG. 2 is a block diagram illustrating a structure of a coding unit according to the first embodiment.
FIG. 3 is a diagram for explaining a coding process by a signal conversion unit according to the first embodiment.

The coding unit 120 performs a coding process by mapping the signal inputted from the binary/quadrary conversion unit 110 to a signal level that represents the value of the signal. This coding unit 120 includes, as shown in FIG. 2, a previous value storage unit 121 for storing a previous value that is obtained by coding the immediately preceding data, and a signal conversion unit 122 for performing a coding process on the basis of the previous value that is stored in the previous value storage unit 121 and the signal outputted from the binary/quadrary conversion unit 110. The signal conversion unit 122 maps the signal to a signal level other than the level of the signal that has been coded immediately before, with reference to a conversion table as shown in FIG. 3. The conversion table shown in FIG. 3 defines the signal levels to which the symbols to be transmitted, i.e., "01", "11", "00", or "10", are mapped on the basis of the previous signal level (0 to 4), so that the symbols are mapped to signal levels that are different from the previous levels. For example, when the previous value stored in the previous value storage unit 121 is a signal level "0", and a symbol "01" is newly inputted from the binary/quadrary conversion unit 110, the signal conversion unit 122 converts this symbol into a signal level "1". The inputted signals are similarly mapped to four-value signal levels other than the respective previous signal levels. Thus, the coding unit 120 encodes the signal into a signal level that is different from the previous signal level in any case.

Frequency components of the coded signal, which are higher than half of the symbol rate, are eliminated by the digital filter 130. This digital filter 130 is a low-pass filter that allows a band of frequency components corresponding to half of the symbol rate to pass, and this digital filter is practically constructed so as to provide appropriate roll-off characteristics in conjunction with the digital filter 240 on the receiving end 200. The transmission of pulse signals requires an infinite bandwidth, but when the signal is passed through a filter having the roll-off characteristics, the signal is turned into a signal within a band that is slightly larger than half of the symbol rate, and converted into a signal without interference between adjacent codes in the reading timing. Accordingly, the data to be transmitted is converted into a signal in a limited band.

The signal that has passed through the digital filter 130 is converted into an analog signal by the D/A conversion unit 140. That is, the signal is converted into a signal that includes a coded symbol in symbol timing of each symbol cycle. Folding frequency components of the analog signal, which appear in a band of frequencies that are twice as high as the frequencies that have passed through the digital filter 130 or higher frequencies, are attenuated by the low-pass filter 150, and the obtained signal is transmitted to the differential driver 160. The differential driver 160 converts the inputted signal into two signals having amplitudes which are proportional to the inputted signal and opposite polarities relative to a reference potential, and transmits the obtained two signals to the low-pass filters 170a and 170b, respectively.

The low-pass filters 170a and 170b have the same attenuation characteristics. Further, combination of the low-pass filter 150 and the low-pass filter 170a or 170b has low-band cutoff characteristics for eliminating noises which are caused by folding distortion of the digital filter 130. It has certain pass amplitude characteristics and delay characteristics in the transmission signal band, and realizes sufficient cutoff characteristics in a band in which primary folding distortion components of the digital filter 130 will appear. For example, when the sampling cycle of the digital filter 130 is four times as high as the symbol rate, the approximately 100 dB attenuation characteristics are required in a band that is six times as high as the symbol rate, in which the primary folding distortion components will appear. In this case, 100 dB attenuation characteristics are dividedly given to the low-pass filter 150 and the low-pass filter 170a or 170b.

The low-pass filters 170a and 170b eliminate the folding distortions of the digital filter 130 and noises caused by the differential driver 160, from the inputted signal. Then, the common mode choke coil 180 eliminates common mode noises of the signal, and outputs the obtained signal to the twisted pair cable 300.

The signal that is transmitted through the twisted pair cable 300 is a signal that is always coded so as to have a signal level different from the previous signal level, and this signal has values which constantly vary with symbol timing.

Then, the receiving end 200 makes the transmission signals which have been transmitted through both wires of the twisted pair cable 300 pass through the low-pass filter 210, to eliminate noises outside a predetermined signal band. For example, larger noises in the range of some kilohertz to one GHz may be contained when the apparatus is mounted on a motor vehicle and, when such high-frequency noises are contained, the frequency characteristics of the differential receiver 220 in the next stage cannot compensate for desired characteristics. Accordingly, the low-pass filter 210 cuts off components of an area in which the frequency characteristics of the differential receiver 220 cannot compensate for the desired characteristics, as well as converts the signal into a signal of a band which can be processed by the digital filter 240 that is connected in the later stage.

Then, the signal from which the noises have been eliminated by the low-pass filter 210 is received by the differential receiver 220. The differential receiver 220 outputs a signal which is proportional to a difference signal between the both wires of the twisted pair cable 300, and then the outputted signal is converted into a digital signal by the A/D conversion unit 230. Here, the synchronization unit 270 generates a synchronized sampling clock and transmits the sampling clock to the A/D conversion unit 230, so that the A/D conversion unit 230 performs sampling in the symbol timing.

Figures 6, 7:
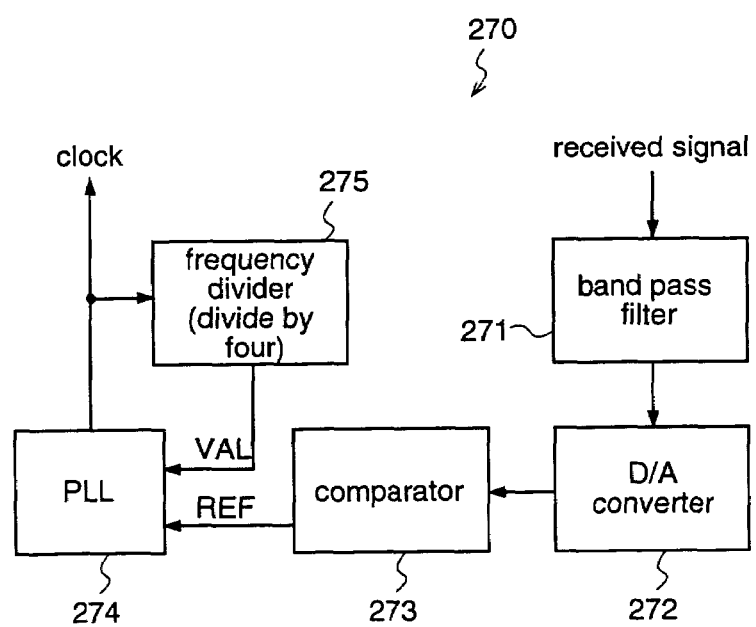
FIG. 6 is a diagram for explaining a decoding process by a signal conversion unit according to the first embodiment.
FIG. 7 is a block diagram illustrating a structure of a synchronization unit according to the first embodiment.

The synchronization unit 270 includes a band pass filter 271, a D/A converter 272, a comparator 273, a PLL 274, and a frequency divider 275, as shown in an example of the construction of FIG. 7. Here, the frequency division rate of the frequency divider 275 is decided depending on how many times the sampling cycle is as high as the symbol cycle. For example, when the sampling rate is twice as high as the symbol rate, the frequency is divided by four. The synchronization unit 270 makes clock synchronization utilizing the signal levels of the received signal, which constantly vary with the symbol cycle. Frequency components corresponding to half of the symbol rate are extracted from the received signal by the band pass filter 271, then the signal is converted into an analog signal by the D/A converter 272, and the analog signal is converted into a square wave signal by the comparator 273. This square wave signal is inputted to the PLL 274 as a reference clock (REF), and phase comparison is performed between the reference clock and a clock (VAL) that is obtained by dividing the frequency of a clock outputted from the PLL 274 in the frequency divider 275, thereby establishing the clock synchronization. Consequently, the A/D conversion unit 230 samples the signal in the symbol timing, thereby to converts the analog signal into a digital signal. The structure of the synchronization unit 270 is not limited to that shown in FIG. 7, and reproduction synchronization can be easily realized on the receiving end utilizing the fact that the values of other means also constantly vary with the symbol cycle.

The obtained digital signal is passed through the digital filter 240. The digital filter 240 provides roll off characteristics in conjunction with the digital filter 130 on the transmitting end 100, and converts the passed digital signal into a signal that has no interference between adjacent codes and can be read in appropriate timing.

Figure 4:
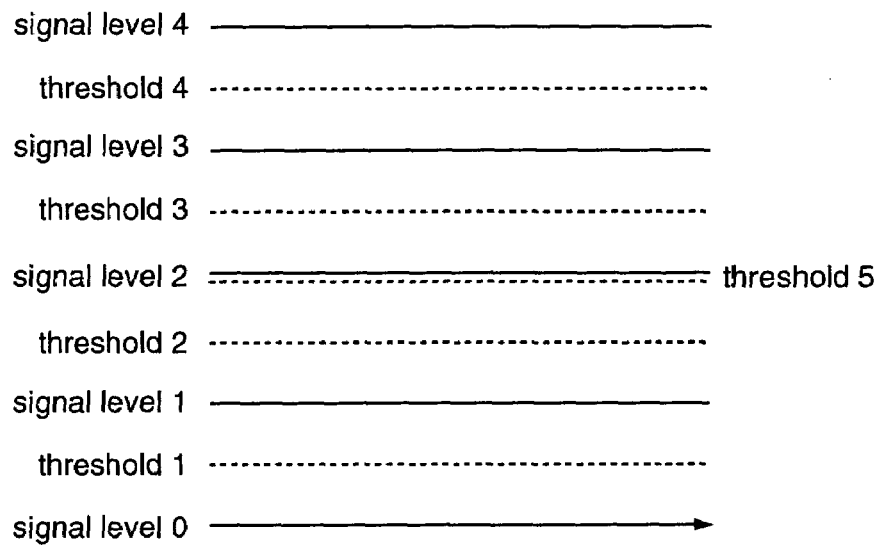
FIG. 4 is a diagram for explaining an evaluation process by an evaluation unit according to the first embodiment.

Then, the evaluation unit 250 evaluates the level of the signal that has been sampled in symbol timing, to decide a signal level from five-value levels. This evaluation process is carried out as shown in FIG. 4, and the evaluation unit 250 evaluates the level of the sampled signal to decide one of signal levels 0, 1, 2, 3 and 4, on the basis of thresholds 1, 2, 3, and 4.

Figure 5:
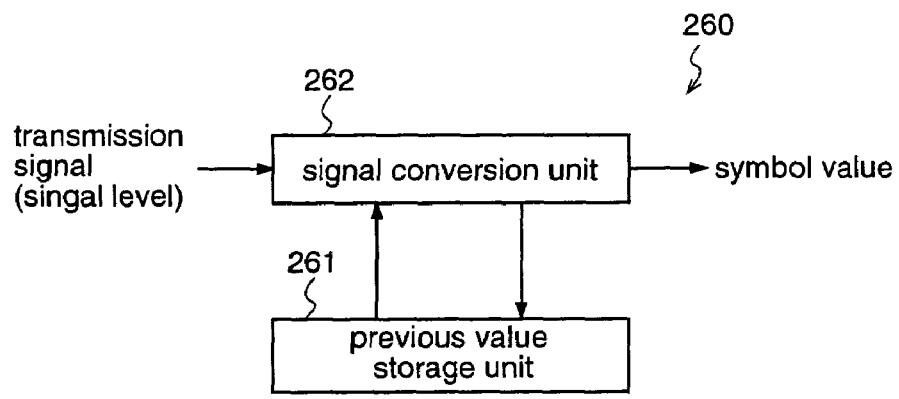
FIG. 5 is a block diagram illustrating a structure of a decoding unit according to the first embodiment.

The decoding unit 260 converts the signal level that has been evaluated by the evaluation unit 250 into 2-bit receipt data. This decoding unit 260 includes, as shown in FIG. 5, a previous value storage unit 261 for storing a previous signal level that has been evaluated by the evaluation unit 250 in the immediately preceding symbol timing, and a signal conversion unit 262 for performing a decoding process on the basis of the signal level stored in the previous value storage unit 261 and the signal level outputted from the evaluation unit 250. The signal conversion unit 262 decodes the signal level into a symbol with reference to the conversion table shown in FIG. 6. The conversion table in FIG. 6 is identical to the table that is employed at the coding by the coding unit 120 of the digital data transmission apparatus, and the receipt data is obtained with reference to the same conversion table as employed at the conversion in the digital data transmission apparatus. For example, when the previous value stored in the previous value storage unit 261 is the signal level 0 and when a signal level 4 (set value) is newly inputted from the evaluation unit 250, the signal conversion unit 262 converts the signal level into a symbol "10".

Now, a description will be given of a large reduction in electromagnetic waves emitted from the twisted pair cable 300 as the transmission cable of the digital data transmission apparatus according to the first embodiment.

One of the International Standards associated with electromagnetic wave noises emitted from equipment or communication lines on motor vehicles is CISPR25. CISPR25 defines a limitation value on the emitted noises for each frequency.

For example, in the case of a balanced transmission through a twisted pair cable without shielding, a limitation value is defined for a frequency band of 30 MHz or higher, in which the amount of emitted noises is relatively difficult to reduce. Thus, when signals in a frequency band of 30 MHz or higher are transmitted, it is difficult to satisfy the on-vehicle requirements. A limitation value for the emitted noises is defined also for a band of 30 MHz or lower, while in this case it is possible to reduce the amount of noises by keeping balancing. Therefore, when the frequency band of the transmission signal is reduced to 30 MHz or lower, the amount of emitted noises which complies with the on-vehicle requirements can be obtained.

The twisted pair cable 300 has errors in the twisting pitch or the length of a wire connecting to the driver, and accordingly the transmission signal is slightly out of phase. The influence of the phase shifting gets larger as the frequencies of the signals to be transmitted are higher, and the signals do not cancel out the emitted noises. Thus, the digital filter performs a band limitation so that the signal bands of transmission signals are within the range of frequencies in which the emitted noises sufficiently cancel each other out.

Figures 8, 9, 10:
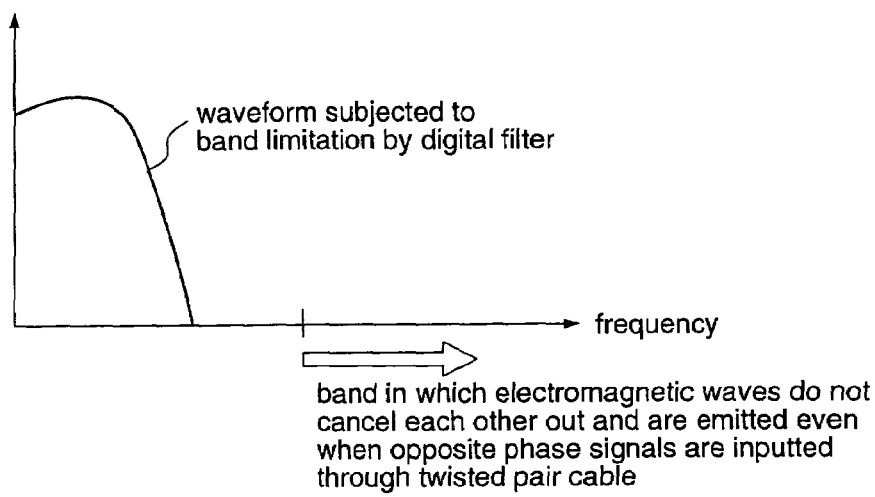
FIG. 8 is a diagram for explaining a noise elimination effect according to the first embodiment.
FIG. 9 is a diagram for explaining possible values in a case where data are coded by a bi-phase mark method according to the first embodiment.
FIG. 10 is a diagram for explaining symbol arrangement on the basis of a difference from the previous value, as another example of the coding process by the signal conversion unit according to the first embodiment.

FIG. 8 is a diagram for explaining the relation between the noise elimination effect and the frequency level at the transmission through a twisted pair cable. The noise elimination effects of the twisted pair cable vary with the production precision, but the noise elimination effect is noticeably reduced when the frequency is beyond approximately 30 MHz. Accordingly, the digital filter limits the signal band to below 30 MHz.

The digital filter 130 samples the signal at a frequency higher than the symbol rate. Then, the digital filter 130 sets frequency characteristics so that the combined characteristics of the digital filter 130 and the digital filter 240 have roll-off characteristics relative to half of the symbol rate, and the obtained characteristics are equally divided and given to the digital filters 130 and 240. A digital filter having such characteristics may be constituted by tens of FIR (FINITE IMPULSE RESPONSE) digital filters having coefficients.

The digital filters 130 and 240 are low-pass filters that allow frequencies up to a level slightly higher than half of the symbol rate, to pass.

Therefore, signals having opposite polarities of a frequency band that is slightly higher than half of the symbol rate (which are accurately calculated on the basis of the rate of the roll-off characteristics, i.e., the percentage) are transmitted through the twisted pair cable 300. Then, the signals having opposite polarities are passed through two transmission wires of the twisted pair cable 300, then cancel the electromagnetic waves emitted therefrom each other out, resulting in almost no noise emission.

When 48 Mbps transmission is to be performed, the number of bits transmitted per symbol is set at 2 bits, and the symbol rate in this case is 24 MHz.

Further, when the roll off filter that is constituted by the digital filters 130 and 240 includes the roll off characteristics of approximately 15% relative to 12 MHz, the signal band can be limited to approximately 15 MHz. Such characteristics are realized by utilizing characteristics of a digital filter that enables to flexibly design frequency characteristics or phase characteristics and can realize steep frequency characteristics with ideal phase characteristics, thereby to limit a band of the data to a frequency band of the twisted pair cable having the noise elimination effect. Further, the multi-valued transmission enables to lower the symbol rate, thereby realizing a higher transmission rate.

As described above, according to the digital data transmission apparatus and the transmission line coding method and decoding method of the first embodiment, signal levels which are more than the number of symbols to be transmitted are provided, and the signal level representing each symbol in each symbol transmission timing is mapped to a signal level other than the signal level that was transmitted in the previous symbol timing. Thus, in any case, the signal can be converted into a signal level that is different from the previous signal level and, accordingly, the signals outputted from the transmitting end 100 always have values varying with the symbol cycle, thereby facilitating the synchronization on the receiving end 200. Further, the signal level that represents a symbol is transmitted each time the symbol is coded, thereby enabling the data transmission with little delay.

In addition, the digital filter 130 and the digital filter 240 constitute a filter having appropriate roll off characteristics, whereby the signal that has passed through the filters is converted into a signal within a frequency band that is slightly larger than half of the symbol rate. Further, the signal is converted into a signal without interference between adjacent codes in predetermined timing, so that a code included in the signal can be read in predetermined timing.

The coding unit 120 converts a signal into a symbol that enables transmission of data comprising 2 or more bits per symbol timing, whereby efficient data transmission can be performed in a limited frequency band.

In the coding unit 120, the previous signal level is stored in the previous value storage unit 121, and the signal conversion unit 122 encodes a symbol to be transmitted on the basis of the previous signal level. Therefore, the signal can be mapped to a signal level other than the signal level which was transmitted in the previous symbol timing, whereby the signal is converted into a signal level that is different from the previous signal level in any case.

In the decoding unit 260, the previous signal level is stored in the previous value storage unit 261, and the signal conversion unit 262 decodes the received signal level on the basis of the previous signal level, whereby the transmitted symbol is obtained from the received signal level. In addition, a symbol that is represented by a signal level is obtained each time the signal level is received, thereby enabling the data receipt with little delay.

Further, 2-bit data is transmitted per symbol and the number of symbols to be transmitted is set at four, so that efficient data transmission is performed in a limited band.

Further, signal levels which are more than the number of symbols to be transmitted are provided, so that the previous signal level is prohibited and the symbol to be transmitted is mapped to the signal level other than the previous value, whereby continuous outputs of the same signal level is avoided.

Furthermore, the symbols to be transmitted are mapped to the signal levels in the order of "01", "11", "00", and "10" starting from the lowest signal level, so that the symbols can be mapped to the corresponding predetermined signal levels.

The symbols are made correspond to the respective signal levels other than the previous signal level on the basis of the signal level of the immediately preceding detected signal, to decode the detected signal level into a symbol, whereby the transmitted symbol can be obtained from the received signal level. Further, a symbol that is represented by a signal level can be obtained each time the signal level is received, thereby realizing the data receipt with little delay.

The synchronization unit 270 extracts, from a receipt signal, frequency components having a cycle that is half of the symbol cycle signal, and controls the symbol extraction timing on the basis of the phase of the extracted signal, whereby a more reliable synchronization can he established utilizing changes in the signal level of the receipt signal.

Further, the noise elimination characteristics that are needed by the low-pass filter are dividedly given to the two low-pass filters, i.e., the low-pass filter 150 and the low-pass filter 170a or 170b, so that there is no need to give steep attenuation characteristics to each of the low-pass filters, resulting in a uncomplicated structure of the filter, and a reduced production cost. In addition, noises caused by the distortion of the differential driver 160 can be eliminated.

In the digital transmission of audio data, the data that has been coded according to the bi-phase mark method are transmitted using a plastic optical fiber or the like. It is envisioned that these signals that have been coded by the bi-phase mark method are transmitted/received also by the digital data transmission apparatus of the present invention. FIG. 9 is a diagram showing possible values in the case where the signals are coded by the bi-phase mark method. In this figure, symbols other than circled and boxed symbols will not be coded. Values which can be taken in each symbol timing are binary, and the distance between adjacent symbols is 2 or more symbols across the signal level 2.

When the digital data transmission apparatus according to this invention transmits/receives data corresponding a bit string or data that has been coded by the bi-phase mark method, a transmission method instruction signal is inputted to the coding unit 120 and the evaluation unit 250, to switch between a case of transmitting simply a bit string and a case of transmitting the data that has been coded by the bi-phase mark method.

When the transmission method instruction signal indicates the bi-phase mark method, the coding unit 120 encodes an inputted symbol with referring to the conversion table shown in FIG. 9.

When the transmission method instruction signal indicates the bi-phase mark method, the evaluation unit 250 decides whether a received signal is higher or lower than threshold 5 shown in FIG. 4. When the previous signal level is 0, and when the received signal is higher than the threshold 5 the signal level of the received signal is set at 3, while the signal level is set at 1 when the received signal is lower than the threshold 5. Similarly, when the previous signal level is 1 and when the received signal is higher than the threshold 5 the signal level of the received signal is set at 3, while the signal level is set at 0 when the received signal is lower than the threshold 5. When the previous signal level is 3, and when the received signal is higher than the threshold 5 the signal level of the received signal is set at 4, while the signal level is set at 1 when the received signal is lower than the threshold 5. When the previous signal level is 4, and when the received signal is higher than the threshold 5 the signal level of the received signal is set at 3, while the signal level is set at 1 when the received signal is lower than the threshold 5.

Thus, the transmission/receipt of data which have been coded according to the bi-phase mark method can realize resistance to noises that is quite close to the binary transmission. On the receiving end 200, a threshold at the threshold evaluation with the previous signal level and the signal level of the received signal is set at threshold 5, and the symbol can be decoded by evaluating the signal only by deciding whether it is higher or lower than a threshold, like in the binary transmission, thereby realizing signal detection having a reliability that is quite close to the binary evaluation. Further, possible values taken in each symbol timing are binary, and the distance between symbols is two or more symbols across the signal level 2, so that the possibility of errors caused by noises can be suppressed to a level as low as the binary transmission.

In this embodiment, the four-value symbol is converted into five-value signal levels, while also in cases where the four-value symbol is converted into multivalue signal levels which are more than four, such as 8-value or 16-value, the similar method is used to prevent a code from being mapped to the signal level of the immediately preceding signal, and accordingly the same effects are obtained.

In this embodiment, the coding by the coding unit 120 is performed with reference to the conversion table as shown in FIG. 3, while the coding is not restricted to this method, but the coding can be performed with reference to a conversion table as shown in FIG. 10.

The conversion table shown in FIG. 10 defines signal levels to which symbols to be transmitted are mapped, on the basis of a difference in signal level from the previous signal level corresponding to the immediately preceding transmitted signal. More specifically, when a symbol "10" is transmitted, this symbol is mapped to a signal level that is larger than the previous signal level by one level, or a signal level smaller than the previous signal level by four levels. Similarly, a symbol "00" is mapped to a signal level that is larger than the previous signal level by two levels, or a signal level smaller than the previous signal level by three levels. A symbol "11" is mapped to a signal level that is larger than the previous signal level by three levels, or a signal level smaller than the previous signal level by two levels. A symbol "01" is mapped to a signal level that is larger than the previous signal level by four levels, or a signal level smaller than the previous signal level by one level.

Figure 11:
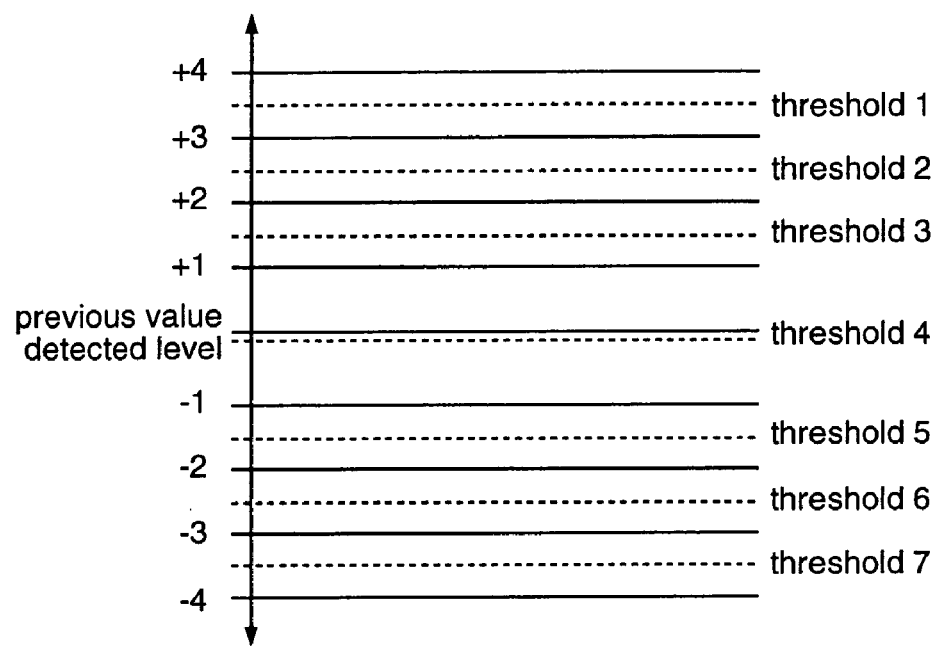
FIG. 11 is a diagram for explaining another example of the evaluation process by the evaluation unit according to the first embodiment.

When the signal level that has been coded on the basis of the difference in signal level is received to be decoded, the evaluation unit 250 detects a difference from the previous signal level corresponding to the immediately preceding received signal, thereby to obtain a symbol. More specifically, the previous signal level is stored, then a difference between the stored signal level and the received signal level is obtained, and the obtained difference is evaluated on the basis of thresholds 1 to 7 as shown in FIG. 11, thereby to assigning one of signal evaluation values "−4" to "+4" to the received signal. Then, the obtained signal evaluation value is transmitted to the decoding unit 260. The decoding unit 260 decodes the signal evaluation values "−4", "−3", "−2", "−1", "+1", "+2", "+3", and "+4" into symbols "01", "11", "00", "10", "01", "11", "00", and "10", respectively.

Thus, the symbol of the transmitted signal can be decided only on the basis of the difference in signal level from the previous signal, so that for example when the transmitting end 100 and the receiving end 200 have different potentials or the potentials vary, and even when the absolute voltage level cannot be detected on the transmitting end 100, the data can be correctly decoded by detecting the difference from the immediately preceding received signal level. Further, the transmitting end 100 always maps a symbol to a signal level other than the previous signal level and transmits the obtained symbol, so that the voltages constantly vary with symbol. Therefore, it is satisfactory that the receiving end 200 detects alternating components (the voltage fluctuation level), and when the potential difference between the transmitting end 100 and the receiving end 200 is quite large, a circuit for cutting off the alternating components can be provided in the receiving end. This is useful in circumstances where the transmitting end and the receiving end have different ground levels or where the voltage-resistant characteristics are demanded, such as in a case where the apparatus is mounted on a motor vehicle.

At the coding on the basis of the signal level difference, data which has been coded by the bi-phase mark method may be mapped to a signal level with referring to the conversion table shown in FIG. 10. When the data that has been coded by the bi-phase mark method is coded on the basis of the difference from the previous signal level, the distance between symbols is always two ore more levels, so that the evaluation is performed by setting a threshold at an intermediate signal level between respective possible symbols, thereby to realize the data receipt with higher precision.

Further, other than the coding of symbols with reference to the conversion table as shown in FIG. 10, another conversion table may be employed so long as symbols are mapped on the basis of a difference between the previous signal level and the next assumable signal level.

Figure 12:
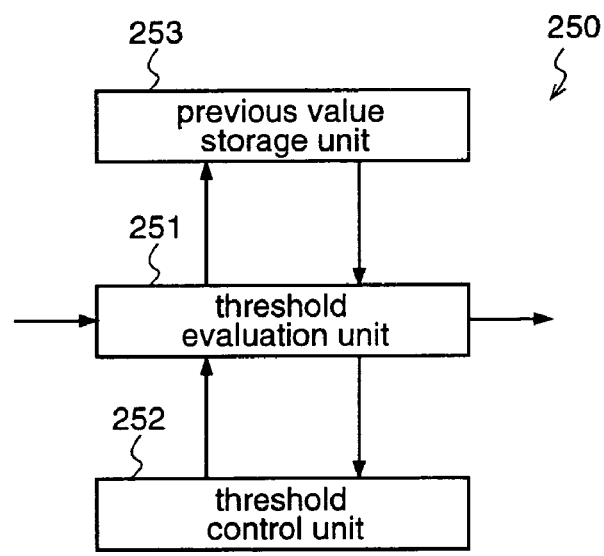
FIG. 12 is a block diagram for explaining another structure of the evaluation unit according to the first embodiment.

When a signal level that has been coded on the basis of the signal level difference is received and decoded, the evaluation unit 250 may be constructed as shown in FIG. 12. FIG. 12 is a block diagram illustrating another construction of the evaluation unit 250. This evaluation unit 250 includes a threshold evaluation unit 251 that holds a threshold and subjects a signal that has passed through the digital filter 240 to threshold evaluation, a threshold control unit 252 that controls the threshold, and a previous value storage unit 253 that stores the immediately preceding signal level.

The threshold evaluation unit 251 calculates a difference between the signal level of a signal that has passed through the digital filter 240 and the previous signal level that is stored in the previous value storage unit 253, and evaluates the obtained difference on the basis of thresholds 1 to 7 as shown in FIG. 11, thereby assigning one of signal evaluation values "−4" to "+4" to the signal. Then, the variation in the signal level (signal evaluation value) is transmitted to the decoding unit 260, as well as the present signal level is stored in the previous value storage unit 253, and the difference between the signal evaluation value (evaluation result) and the previous signal level is transmitted to the threshold control unit 252. Then, the threshold control unit 252 calculates differences corresponding to one variation in the threshold, on the basis of the received difference and the signal evaluation value. That is, the average of differences in signal levels corresponding to one variation in the threshold, during past plural symbol timings is obtained, and the obtained average is transmitted to the threshold evaluation unit 251 as a threshold control signal. The average is obtained considering also that spaces between the thresholds 3 and 4, and the thresholds 4 and 5 are 1.5 times as large as spaces between other thresholds in the case of FIG. 11. Then, the threshold evaluation unit 251 changes the threshold in accordance with the threshold control signal.

Thus, the threshold is modified on the basis of the evaluation result on the signals that have been received for a predetermined period. Accordingly, in cases where the transmitted voltage varies according to the change in the supply voltage or the like, correct data can be obtained by modifying the threshold.

In this embodiment, when modifying the threshold, the evaluation unit 250 obtains differences corresponding to one variation in the threshold to obtain an average. However, any value such as a value corresponding to the maximum amplitude may be obtained so long as this value enables to modify changes in the amplitude level in the signal waveform which has been transmitted from the transmitting end 100, and the threshold can be appropriately modified by averaging such values during a predetermined period.

In this embodiment, the modification of the threshold is performed after the processing by the digital filter is performed, while the threshold may be fixed and the received signal is amplified to change the amplitude into an appropriate level.

Further, in this embodiment, signal levels which are one more than the number of symbols are provided, then a signal level of a signal that was transmitted in the previous symbol timing is employed as a prohibit level, and the symbol is mapped to other signal level. However, the number of signal levels may be increased, thereby to increase the number of prohibit levels. For example, increase or decrease of the previous signal level with relative to a signal level that is antecedent to the previous signal level is stored and, when the signal level is dropping, signal levels which are lower than the previous signal level are prohibited in the next symbol timing. On the other hand, when the signal level is rising, signal levels which are higher than the previous signal level are prohibited. The signal waveform in this case constantly rises and drops repeatedly in each symbol timing, whereby a synchronization clock having a stable phase is generated on the receiving end.

In this embodiment, the descriptions have been given of the signal transmission according to the multi-valued baseband transmission, while emitted noises can be reduced in the same manner as in this embodiment also in cases where modulation such as ASK (amplitude shift keying) or 64QAM (Quadrature Amplitude Modulation) is performed. When the modulation is performed, signal bands are located on both sides of the modulation frequency, so that the frequency required for each symbol rate at the baseband transmission is reduced to half, whereby the limited band due to the characteristics of the twisted pair cable is effectively utilized, resulting in higher-speed transmission. Further, when the phase and amplitude are both subjected to the modulation like in 64QAM, more efficient transmission can be performed, thereby realizing a higher transmission rate also when the same twisted pair cable is employed.

INDUSTRIAL AVAILABILITY

The present invention provides a digital data transmission apparatus, and a transmission line coding method and decoding method for converting digital data into multi values to be coded so that the same signal level does not successively appear, thereby enabling high-speed data transmission, as well as reducing noise emission in a band of 30 MHz or lower by means of a digital filter up to the amount that is compliant with requirements for mounting on motor vehicles.

The invention claimed is:
1. A digital data transmission system comprising:
a data coding unit operable to convert digital data into a signal level corresponding to a symbol that is assigned to the digital data in each symbol cycle as a prescribed unit cycle;
a first digital filter having a first sampling cycle that is shorter than a unit cycle of a signal level string which has been obtained by said data coding unit, said first digital filter being operable to pass only predetermined frequencies;
a D/A converter operable to convert a digital data stream that has passed though said first digital filter into an analog signal;
a first low-pass filter operable to eliminate folding distortion of said first digital filter from the analog signal obtained by said D/A converter, which distortion is decided in the first sampling cycle;
a differential driver operable to convert an output of said first low-pass filter into two converted signals having opposite polarities relative to a predetermined reference potential, and to differentially output the converted signals;
a second low-pass filter operable to eliminate a predetermined frequency band from each of the converted signals which are outputted from said differential driver, and to output obtained signals up to a twisted pair cable;
a differential receiver operable to receive transmission signals which are transmitted through the twisted pair cable, and to convert a difference in potential between two wires of the cable pair into a signal;
an A/D converter operable to convert the signal outputted from said differential receiver into a digital signal value in each second sampling cycle;

a second digital filter operable to pass only a predetermined frequency band of a digital data stream that has been obtained by sampling a signal of said A/D converter; and a level evaluator operable to evaluate a symbol value from a level of a signal in symbol timing, including a symbol in the signal, based on an output from said second digital filter, and to convert the symbol value into corresponding digital data, wherein said first and second digital filters both have low-pass characteristics, and said first digital filter has frequency characteristics of cutting off at least frequency data which are higher than a frequency band in which electromagnetic waves emitted from the respective signals that pass through the twisted pair cable cancel out, thereby to eliminate emission of the electromagnetic waves to outside the twisted pair cable, and wherein a combination of said first low-pass filter and said second low-pass filter provides low-cut characteristics of eliminating folding distortion of said first digital filter, which is decided in the first sampling cycle.

2. The digital data transmission system of claim 1, wherein said first and second digital filters have transmission characteristics that exhibit roll-off characteristics in a case where signals are passed through said two digital filters.

3. A digital data transmission apparatus operable to transmit data signals using a twisted pair cable, said apparatus comprising:

a data coding unit operable to convert digital data into a signal level corresponding to a symbol that is assigned to the digital data in each symbol cycle as a prescribed unit cycle;

a first digital filter having a first sampling cycle that is shorter than a unit cycle of a signal level string which has been obtained by said data coding unit, said first digital filter being operable to pass only predetermined frequencies;

a D/A converter operable to convert a digital data stream that has passed through said first digital filter into an analog signal;

a first low-pass filter operable to eliminate folding distortion of said first digital filter from the analog signal obtained by said D/A converter, which distortion is decided in the first sampling cycle;

a differential driver operable to convert an output of said first low-pass filter into two converted signals having opposite polarities relative to a predetermined reference potential, and to output the converted signals; and a second low-pass filter operable to eliminate a predetermined frequency band from each of the converted signals which are outputted from said differential driver, and to output obtained signals to the twisted pair cable, wherein said first digital filter has low-pass characteristics of cutting off at least frequency data which are higher than a frequency band in which electromagnetic waves emitted from the respective signals that pass though the twisted pair cable cancel out, thereby to eliminate emission of electromagnetic waves to outside the twisted pair cable, and wherein a combination of said first low-pass filter and second low-pass filter provides low-cut characteristics of eliminating folding distortion of said first digital filter, which is decided in the first sampling cycle.

4. The digital data transmission apparatus of claim 3, further comprising a common mode choke coil operable to eliminate common mode noises from the signals from which the predetermined frequency band has been eliminated by said second low-pass filter, and to output obtained signals to the twisted pair cable.

5. The digital data transmission apparatus of claim 3, wherein said first digital filter has transmission characteristics that exhibit roll-off characteristics in the case where transmission signals are passed through said first digital filter and a second digital filter, wherein said second digital filter is included in a digital data receiving apparatus that is connected in a stage subsequent to said digital data transmission apparatus and comprises a differential receiver operable to receive transmission signals that are transmitted from a digital data transmission apparatus having the same structure as said digital data transmission apparatus and to convert a difference in potential between two wires into a signal; an A/D converter operable to convert the signal outputted from the differential receiver into a digital signal value in each second sampling cycle; said second digital filter operable to pass only a predetermined frequency band of a digital data stream that has been obtained by sampling a signal of the A/D converter; and a level evaluator operable to evaluate a symbol value from a level of a signal in symbol timing, including a symbol in the signal, based on an output from said second digital filter, and to convert the symbol value into corresponding digital data.

6. The digital data transmission apparatus of claim 5, wherein said data coding unit is further operable to convert data, comprising two or more bits per symbol cycle, into a symbol to be transmitted.

7. The digital data transmission apparatus of claim 6, wherein said data coding unit has signal levels which are more than the number of kinds of symbols to be transmitted per symbol cycle, and is further operable to assign a symbol in a symbol transmission timing to one of the signal levels.

8. The digital data transmission apparatus of claim 7, wherein said data coding unit has five signal levels, and is further operable to assign a symbol in a symbol transmission timing to a signal level other than a previous signal level corresponding to a signal which was transmitted in an immediately preceding symbol transmission timing, in the order of 01, 11, 00, 10, starting from a lowest signal level.

9. The digital data transmission apparatus of claim 7, wherein digital data to be transmitted have been coded by a bi-phase mark method, and wherein said data coding unit is further operable to assign a symbol in a symbol transmission timing to a signal level other than a previous signal level corresponding to a signal which was transmitted in an immediately preceding symbol transmission timing, in the order of 01, 11, 00, 10, starting from a lowest signal level, thereby to decide a signal level to be transmitted.

10. The digital data transmission apparatus of claim 7, wherein said data coding unit includes:

a previous level storage unit operable to store a previous signal level corresponding to the signal which was transmitted in an immediately preceding symbol transmission timing; and a coding unit operable to decide a signal level corresponding to the symbol to be transmitted, based on the previous signal level and the transmission symbol.

11. The digital data transmission apparatus of claim 10, wherein said coding unit is further operable to assign a symbol in a symbol transmission timing to a signal level having a predetermined difference from the previous signal level that is stored in said previous signal level storage unit.

12. The data transmission apparatus of claim 11, wherein said data coding unit is supplied with a transmission method instruction signal indicating whether the transmission signal has been coded by the bi-phase mark method.

13. The data transmission apparatus of claim 7, wherein said data coding unit is supplied with a transmission method instruction signal indicating whether the transmission signal has been coded by the bi-phase mark method.

14. The digital data transmission apparatus of claim 6, wherein said data coding unit has five signal levels, and is further operable to assign a symbol in a symbol transmission timing to a signal level other than a previous signal level corresponding to a signal which was transmitted in an immediately preceding symbol transmission timing, in the order of 01, 11, 00, 10, starting from a lowest signal level.

15. The digital data transmission apparatus of claim 14, wherein said data coding unit includes:
   a previous level storage unit operable to store a previous signal level corresponding to the signal which was transmitted in an immediately preceding symbol transmission timing; and
   a coding unit operable to decide a signal level corresponding to the symbol to be transmitted, based on the previous signal level and the transmission symbol.

16. The digital data transmission apparatus of claim 15, wherein said coding unit is further operable to assign a symbol in a symbol transmission timing to a signal having a predetermined difference from the previous signal level that is stored in said previous signal level storage unit.

17. The data transmission apparatus of claim 16, wherein said data coding unit is supplied with a transmission method instruction signal indicating whether the transmission signal has been coded by the bi-phase mark method.

18. The data transmission apparatus of claim 14, wherein said data coding unit is supplied with a transmission method instruction signal indicating whether the transmission signal has been coded by the bi-phase mark method.

19. The digital data transmission apparatus of claim 6,
   wherein digital data to be transmitted have been coded by a bi-phase mark method, and
   wherein said data coding unit is further operable to assign a symbol in a symbol transmission timing to a signal level other than a previous signal level corresponding to a signal which was transmitted in an immediately preceding symbol transmission timing, in the order of 01, 11, 00, 10, starting from a lowest signal level, thereby to decide a signal level to be transmitted.

20. The digital data transmission apparatus of claim 19, wherein said data coding unit includes:
   a previous level storage unit operable to store a previous signal level corresponding to the signal which was transmitted in an immediately preceding symbol transmission timing; and
   a coding unit operable to decide a signal level corresponding to the symbol to be transmitted, based on the previous signal level and the transmission symbol.

21. The digital data transmission apparatus of claim 20, wherein said coding unit is further operable to assign a symbol in a symbol transmission timing to a signal having a predetermined difference from the previous signal level that is stored in said previous signal level storage unit.

22. The data transmission apparatus of claim 21, wherein said data coding unit is supplied with a transmission method instruction signal indicating whether the transmission signal has been coded by the bi-phase mark method.

23. The data transmission apparatus of claim 19, wherein said data coding unit is supplied with a transmission method instruction signal indicating whether the transmission signal has been coded by the bi-phase mark method.

24. The digital data transmission apparatus of claim 6, wherein said data coding unit includes:
   a previous level storage unit operable to store a previous signal level corresponding to the signal which was transmitted in an immediately preceding symbol transmission timing; and
   a coding unit operable to decide a signal level corresponding to the symbol to be transmitted, based on the previous signal level and the transmission symbol.

25. The digital data transmission apparatus of claim 24, wherein said coding unit is further operable to assign a symbol in a symbol transmission timing to a signal having a predetermined difference from the previous signal level that is stored in said previous signal level storage unit.

26. The data transmission apparatus of claim 25, wherein said data coding unit is supplied with a transmission method instruction signal indicating whether the transmission signal has been coded by the bi-phase mark method.

27. The data transmission apparatus of claim 24, wherein said data coding unit is supplied with a transmission method instruction signal indicating whether the transmission signal has been coded by the bi-phase mark method.

28. The data transmission apparatus of claim 6, wherein said data coding unit is supplied with a transmission method instruction signal indicating whether the transmission signal has been coded by the bi-phase mark method.

29. A digital data receiving apparatus operable to receive transmission signals that have been transmitted from a digital data transmission apparatus operable to transmit data signals using a twisted pair cable, the digital data transmission apparatus comprising: a data coding unit operable to convert digital data into a signal level corresponding to a symbol that is assigned to the digital data in each symbol cycle as a prescribed unit cycle; a first digital filter having a first sampling cycle that is shorter than a unit cycle of a signal level string which has been obtained by the data coding unit said first digital filter being operable to pass only predetermined frequencies; a D/A converter operable to convert a digital data stream that has passed through said first digital filter into an analog signal; a first low-pass filter operable to eliminate folding distortion of said first digital filter from the analog signal obtained by the D/A converter, which distortion is decided in the first sampling cycle; a differential driver operable to convert an output of the first low-pass filter into two converted signals having opposite polarities relative to a predetermined reference potential, and to output the converted signals; and a second low-pass filter operable to eliminate a predetermined frequency band from each of the converted signals which are outputted from the differential driver, and to output obtained signals to the twisted pair cable, wherein said first digital filter has low-pass characteristics of cutting off at least frequency data which are higher than a frequency band in which electromagnetic waves emitted from the respective signals that pass through the twisted pair cable cancel out, thereby to eliminate emission of electromagnetic waves to outside the twisted pair cable, and by combining the first low-pass filter and the second low-pass filters, wherein a combination of the first and second low-pass filters have low-cut characteristics of eliminating folding distortion of said first digital filter, which is decided in the first sampling cycle, said digital data receiving apparatus comprising:

a differential receiver operable to receive transmission signals which are transmitted from said digital data transmission apparatus through the twisted pair cable, and to convert a difference in potential between two wires of the cable into a signal;

an A/D converter operable to convert the signal outputted from said differential receiver into a digital signal value in each second sampling cycle;

a second digital filter operable to pass only a predetermined frequency band of a digital data stream that has been obtained by sampling a signal of said A/D converter; and a level evaluator operable to evaluate a symbol value from a level of a signal in symbol timing, including a symbol in the signal, based on an output from said second digital filter, and to convert the symbol value into corresponding digital data.

30. The digital data receiving apparatus of claim 29, wherein said second digital filter has transmission characteristics that exhibit roll-off characteristics in the case where the transmission signals are passed through said first digital filter and said second digital filter.

31. The digital data receiving apparatus of claim 30, wherein said level evaluator is supplied with a transmission method instruction signal indicating whether the received signal has been coded by the bi-phase mark method.

32. The digital data receiving apparatus of claim 29,
wherein said level evaluator comprises a signal level detector operable to detect a signal level in each symbol cycle, and a previous signal level storage unit operable to store the previous signal level which was received in an immediately preceding symbol receipt timing, and wherein said level evaluator is operable to decode the signal level detected by said signal level detector into a corresponding symbol, based on the previous signal level that is stored in said previous signal level storage unit.

33. The digital data receiving apparatus of claim 32, wherein said level evaluator further includes:

a threshold controller operable to correct an evaluation threshold level based on variation values in respective signal levels which were received during a predetermined period;

a previous signal level storage unit operable to store a previous signal level corresponding to a signal which was received in an immediately preceding symbol receiving timing; and a threshold evaluator that has a threshold value, and that is operable to perform threshold evaluation to a difference in signal level between a signal level detected in a symbol receipt timing and the previous signal level, thereby to decode a symbol value.

34. The digital data receiving apparatus of claim 33, wherein said level evaluator further includes a synchronization unit operable to establish synchronization with a symbol cycle of a received signal, to extract frequency components having a half cycle as long as the symbol cycle from the received signal and to control a symbol timing at which a symbol is detected based on a phase of an extracted signal.

35. The digital data receiving apparatus of claim 34, wherein said level evaluator is supplied with a transmission method instruction signal indicating whether the received signal has been coded by the bi-phase mark method.

36. The digital data receiving apparatus of claim 33, wherein said level evaluator is supplied with a transmission method instruction signal indicating whether the received signal has been coded by the bi-phase mark method.

37. The digital data receiving apparatus of claim 32, wherein said level evaluator is supplied with a transmission method instruction signal indicating whether the received signal has been coded by the bi-phase mark method.

38. The digital data receiving apparatus of claim 29, wherein said level evaluator includes:

a threshold controller operable to correct an evaluation threshold level based on variation values in respective signal levels which were received during a predetermined period;

a previous signal level storage unit operable to store a previous signal level corresponding to a signal which was received in an immediately preceding symbol receipt timing; and a threshold evaluator that has a threshold value, and that is operable to perform threshold evaluation to a difference in signal level between a signal level detected in a symbol receipt timing and the previous signal level, thereby to decode a symbol value.

39. The digital data receiving apparatus of claim 38, wherein said level evaluator further includes a synchronization unit operable to establish synchronization with a symbol cycle of a received signal, to extract frequency components having a half cycle as long as the symbol cycle from the received signal and to control a symbol timing at which a symbol is detected based on a phase of an extracted signal.

40. The digital data receiving apparatus of claim 39, wherein said level evaluator is supplied with a transmission method instruction signal indicating whether the received signal has been coded by the bi-phase mark method.

41. The digital data receiving apparatus of claim 38, wherein said level evaluator is supplied with a transmission method instruction signal indicating whether the received signal has been coded by the bi-phase mark method.

42. The digital data receiving apparatus of claim 29, wherein said level evaluator includes a synchronization unit operable to establish synchronization with a symbol cycle of a received signal, to extract frequency components having a half cycle as long as the symbol cycle from the received signal and to control a symbol timing at which a symbol is detected on a phase of an extracted signal.

43. The digital data receiving apparatus of claim 42, wherein said level evaluator is supplied with a transmission method instruction signal indicating whether the received signal has been coded by the bi-phase mark method.

44. The digital data receiving apparatus of claim 29, wherein said level evaluator is supplied with a transmission method instruction signal indicating whether the received signal has been coded by the bi-phase mark method.

* * * * *

UNITED STATES PATENT AND TRADEMARK OFFICE
CERTIFICATE OF CORRECTION

| | |
|---|---|
| PATENT NO. | : 7,218,678 B2 |
| APPLICATION NO. | : 10/398450 |
| DATED | : May 15, 2007 |
| INVENTOR(S) | : Noboru Katta et al. |

It is certified that error appears in the above-identified patent and that said Letters Patent is hereby corrected as shown below:

ON THE TITLE PAGE

On the front page, right column, Section (56) References Cited, under U.S. PATENT DOCUMENTS, please insert the following reference:

--5,206,857     4/1993     Farleigh--

Signed and Sealed this

Fourteenth Day of October, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,218,678 B2 | Page 1 of 1 |
| APPLICATION NO. | : 10/398450 | |
| DATED | : May 15, 2007 | |
| INVENTOR(S) | : Noboru Katta et al. | |

It is certified that error appears in the above-identified patent and that said Letters Patent is hereby corrected as shown below:

ON THE TITLE PAGE

On the front page, right column, Section (56) References Cited, under U.S. PATENT DOCUMENTS, please insert the following reference:

--5,206,857        4/1993        Farleigh--

Signed and Sealed this

Fourth Day of November, 2008

JON W. DUDAS
*Director of the United States Patent and Trademark Office*

UNITED STATES PATENT AND TRADEMARK OFFICE
CERTIFICATE OF CORRECTION

PATENT NO. : 7,218,678 B2  Page 1 of 1
APPLICATION NO. : 11/398450
DATED : May 15, 2007
INVENTOR(S) : Noboru Katta et al.

It is certified that error appears in the above-identified patent and that said Letters Patent is hereby corrected as shown below:

This certificate vacates the Certificate of Correction issued November 4, 2008. The certificates is a duplicate of the Certificate of Correction issued October 14, 2008. All requested changes were included in the Certificate of Correction issued October 14, 2008.

Signed and Sealed this

Twenty-fifth Day of November, 2008

JON W. DUDAS
*Director of the United States Patent and Trademark Office*